Nov. 10, 1959  M. STAUNT  2,911,721
CONTRA ANGLES FOR DENTAL HANDPIECES
Filed Jan. 8, 1957  2 Sheets-Sheet 1
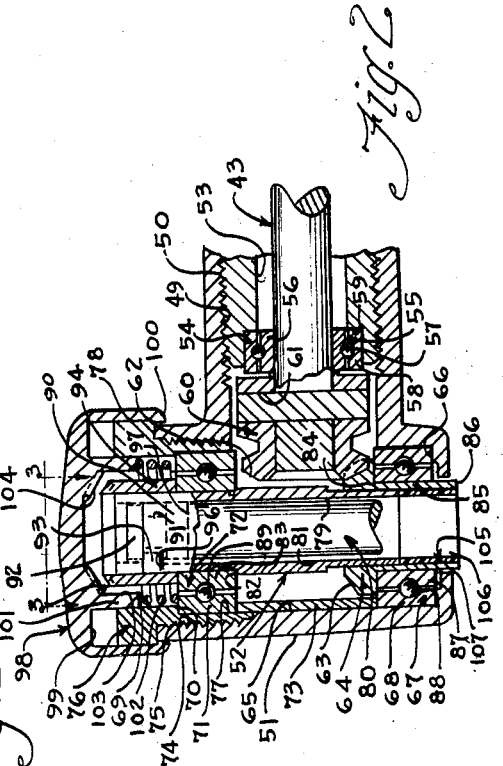
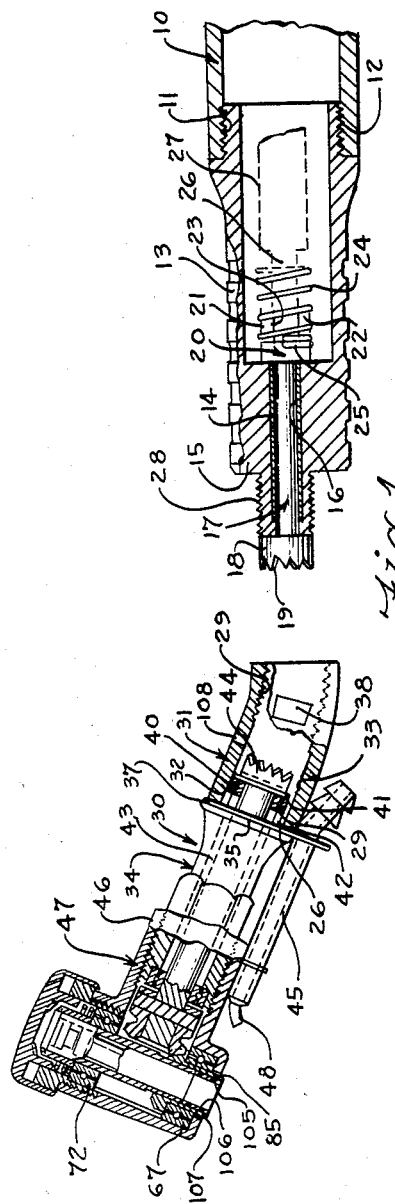
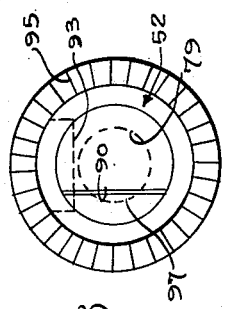
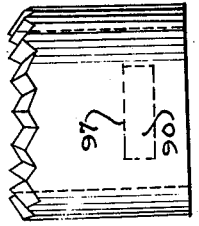
INVENTOR.
Martin Staunt
BY Robert H. Wendt
Attorney Nov. 10, 1959 M. STAUNT 2,911,721
CONTRA ANGLES FOR DENTAL HANDPIECES
Filed Jan. 8, 1957 2 Sheets-Sheet 2

INVENTOR.
Martin Staunt
BY Robert H. Wendt
Attorney

United States Patent Office 2,911,721
Patented Nov. 10, 1959

2,911,721

CONTRA ANGLES FOR DENTAL HANDPIECES

Martin Staunt, Des Plaines, Ill.

Application January 8, 1957, Serial No. 633,068

13 Claims. (Cl. 32—27)

The present invention relates to contra angles for dental handpieces, and is particularly concerned with the provision of a contra angle having an improved structure for securing the tool shank in the transverse rotating shaft of the contra angle.

One of the objects of the invention is the provision of an improved latch for holding the bur shank firmly and securely in the driving shaft, in which the locking member rotates with the bur shank, thereby preventing the heel end of the bur shank from wearing out before the cutting edge of the bur is worn out. Excessive wear on the heel end of the bur shank is apt to occur when the cutting edge is in the form of a diamond tool.

Another object of the invention is the provision of an improved burlatch which removes any end play in the bur and reduces wear on that end of the bur shank which is secured in the contra angle.

Another object of the invention is the provision of an improved burlatch which is adapted to be actuated by a rotating cap having inside teeth in which the teeth are so formed, in case of accidental engagement during the operation of the contra angle, the teeth will be automatically separated.

Another object of the invention is the provision of an improved contra angle burlatch which causes less wear of the bore in the bur tube, and in which the contra angle is kept free of grit or possible tooth structure.

Another object of the invention is the provision of an improved ball bearing contra angle, in which the shank of the bur is gripped by a nylon seal ring for excluding dirt, grit and grindings, and in which there is less wear and vibration than in the devices of the prior art.

Another object of the invention is the provision of an improved contra angle for dental handpieces which is simple in construction, which may be manufactured at a low cost, which is durable and which may be operated at high speeds with a minimum amount of vibration and wear, and which includes such an improved means for securing the tool shank that there is no wear on the secured end of the tool shank because the securing means rotates with the shank.

Other objects and advantages of the invention will be apparent from the following description and the accompanying drawings, in which similar characters of reference indicate similar parts throughout the several views.

Referring to the two sheets of drawings accompanying this specification,

Fig. 1 is a fragmentary view in section, taken along an axial line, showing an improved contra angle and the driving end of the handpiece, to which it is to be attached;

Fig. 2 is a fragmentary axial sectional view taken on the same plane, on an enlarged scale;

Fig. 3 is a top plan view of the securing member for the bur shank;

Fig. 4 is a side elevational view of the securing member for the bur shank, shown apart from the contra angle;

Figures 6, 7:
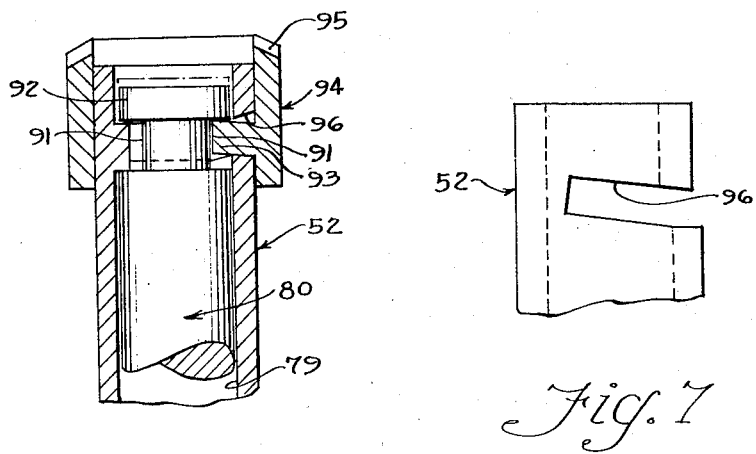
Fig. 6 is a fragmentary axial sectional view taken through the bur tube with the shank in elevation.
Fig. 7 is a fragmentary side elevational view of the upper end of the bur tube.

The present contra angle may be employed with various types of handpieces, and is particularly adapted to be used with the handpiece shown in my prior application, Serial No. 620,434, filed November 5, 1956, on Dental Handpieces, executed October 26, 1956, as shown in Figs. 6 and 7; and the disclosure of said application is incorporated herein by reference thereto.

For example, the handpiece includes a detachable outer sheath 10, which has internal threads 11 at its end for receiving the reduced threaded end 12 of an extension 13.

Extension 13 contains a bearing bore 14 in its closed end 15, which may be provided with a bearing bushing 16 for rotatably supporting a drive shaft 17.

Drive shaft 17 has a gear 18 secured to its end and provided with axially projecting teeth 19, and at its other end drive shaft 17 supports a driving fixture 20, having a pair of axially projecting lugs 21, 22, separated by a groove 23, and surrounded by a coil spring 24, one end of which is secured to the body 20 at 25.

The groove 23 is adapted to receive a pair of similar spaced lugs 26, carried by the driving spindle 27 of the detachable sheath 10. At its end the extension 13 has a reduced threaded portion 28, which can be threaded into the internally threaded end 29 of the contra angle attachment 30.

The internal threads 29 are carried by an elbow 31, having an obtuse angle between its open ends, both of which are threaded internally, as indicated at 29 and 32.

The threaded end 32 is adapted to be threaded on a reduced threaded portion 33, of a tubular body 34, having an annular shoulder 35, and a tube supporting plate 36 may be clamped between the annular shoulder 35 and the end 37 of the elbow 31.

The elbow 31 has a flattened portion 38 for receiving a wrench. Elbow portion 31 has a counterbore 39 for receiving a ball bearing assembly 40, including an outer race engaging an annular shoulder 41 and engaged by a spacer tube 42.

The inner race is carrier by a shaft 43, which is provided at its end with a gear 44, having longitudinally extending teeth for meshing with the teeth 19 when the threaded portion 28 is threaded into bore 29.

Plate 36 supports one or more metal air nozzle tubes 45, which may be soldered to plate 36, and which also extend through a second plate 46, which is clamped between the tubular member 34 and the end of contra angle housing 47.

Nozzle tubes 45 have laterally turned nozzles 48 at their ends for directing air and water against the teeth to be engaged by a bur or other tool.

The contra angle housing 47 has a threaded bore 49 for receiving the threaded end 50 of the tubular member 34, and it has a transverse housing portion 51 for rotatably supporting the bur tube 52.

The tubular member 34 has a through bore 53 for passing the shaft 43, and has a counterbore 54 for receiving the ball bearing assembly 55.

Ball bearing assembly 55 has an inner race 56 mounted on shaft 43, and separated by balls 57 from the outer race 58, which is mounted in counterbore 54 against an annular shoulder 59.

Shaft 43 carries a bevel gear 60, secured to the shaft by a transverse pin 61, passing through both the gear hub and shaft. Bevel gear 60 has beveled teeth 62 for engaging the beveled teeth 63 on a bevel gear 64, carried by the bur tube 52.

The transverse part 51 of the contra angle housing has an internal bore 65 which terminates at an annular shoulder 66 toward the tool end of the housing portion 51.

Figure 5:
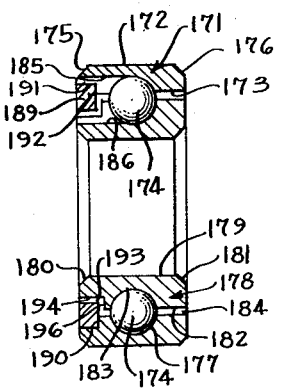
Fig. 5 is an axial sectional view showing the type of ball bearings employed in supporting the bur tube of the contra angle.

A ball bearing of the type shown in Fig. 5 is indicated at 67, and has its outer race 68 in the bore 65 engaging annular shoulder 66.

The housing portion 51 has a smaller counterbore 69 at the top, forming an annular shoulder 70 for engaging the outer race 71 of another ball bearing assembly 72. Outer races 71 and 68 are secured and spaced from each other by a spacer tube 73, which fits in the bore 65, but is cut away on the side toward the bevel gear 60 so that it will not interfere with this bevel gear.

The housing portion 51 has a threaded counterbore 74 for receiving the threaded portion 75 of a threaded plug 76, which contains the counterbore 69, and also has a smaller bore 77. Threaded plug 76 is adapted to secure the outer races and the spacer tube 72 in the housing, but has an outer cylindrical surface 78.

The bur tube 52 comprises a metal tube having an internal bore 79, adapted to receive a bur shank 80, which projects from the lower end and carries a bur or other tool.

The bur tube has a thicker portion at 81, forming an annular shoulder at 82 for engaging below the inner race 83 of the upper ball bearing assembly 72. The bur tube has the reduced cylindrical portion 84, which supports the bevel gear 64, and the bevel gear 64 has a tubular portion 85 extending to the end 86 of the contra angle housing portion 51.

The inner race 87 of the lower bearing is mounted on the tubular portion 85 of the bevel gear 64, and the usual balls 88, 89 are mounted in the grooves of the races. The bur shank 80 is provided with a flattened end portion 90, for engaging a complementary mating flattened portion inside the bore 79 of bur tube 52.

This forms a positive drive between the bur tube and the bur shank. At its upper end the bur shank 80 is provided with an annular groove 91, which may be rectangular in cross section and which leaves an annular head 92 on the end of the bur shank.

Groove 91 is adapted to receive an inwardly projecting pin or prong 93, carried by a rotating burlock 94. Burlock 94 comprises a tubular member adapted to rotate on the upper end of bur tube 52, and provided with shallow V-shaped teeth 95 on its upper end.

Burlock 94 has the inwardly extending prong 93, adapted to extend into the groove 91 of the bur shank, but also extending through an inclined slot 96 in the bur tube 52.

The upper end of the bur tube 52, with its inclined slot 96, is shown in Fig. 7. The lower edge 97, of the flattened portion 90, on the bur shank 80, is forced up against the downwardly turned edge of the flattened portion on the inside of the bur tube 52 by the prong 93.

The plug 76 supports a rotatable cap 98, which has a downwardly open annular groove 99 of rectangular cross section for receiving the plug 76. The lower edge of the cap 98 is crimped inward at 100 to secure it on the contra angle.

The inner wall 101 of cap 98 engages a compression coil spring 102, which is compressed against the outer race 71, urging the cap upward. The cap 98 has a counterbore 103, and is provided with V-shaped teeth 104 for engaging the V-shaped teeth 95, when the cap is depressed.

These teeth are made V-shaped so that in case of accidental engagement while the contra angle parts are rotating, they will not catch permanently but the teeth of the cap will be cammed upward, releasing the rotating parts.

At the lower end of the bur tube 52, in the tubular extension 85 of the bevel gear 64, there is a nylon sleeve or sealing ring 105. This has a tight frictional fit in the tubular extension 85, and has a bore 106 which grips the tool shank 80 and seals it against entry of grit or grindings and also against the exit of air and lubricating mist.

The air and lubricating mist, however, may escape through the ball bearing assembly 67 at the clearance 107, around the tubular extension 85.

The contra angle is preferably provided with ball bearing assemblies 67 and 72 of the type shown in Fig. 5. This ball bearing assembly includes an outer race 171, which is provided with an outer cylindrical surface 172 and an inner cylindrical surface 173.

The inner cylindrical surface has a groove 177 for receiving the balls 174, and the outer race 171 is chamfered at 175, 176 on its outer corners.

The inner race 178 has a cylindrical inner bore 179 and is chamfered at its inner corners 180, 181. The inner race has an outer cylindrical surface 182 provided with the partially circular ball bearing groove 183 for receiving the balls 174.

There is a limited clearance 184 between the inner and outer races which is preferably as small as possible without contact. The outer race is provided with a slot at 185 on one side and the inner race is provided with a slot 186 on the same side to provide for a ball filling opening, and the slots 185, 186 are wide enough and deep enough to pass the balls 174 into the grooves 183 and 177.

The outer race is preferably provided with a counterbore 191, terminating at an annular shoulder 192 for receiving a nylon sealing ring 189. This sealing ring 189 has an outer cylindrical surface 190 that has a tight frictional fit in the counterbore 191, thus holding the nylon sealing ring 189 in the outer race.

The sealing ring 189 has an inner cylindrical surface 193 which clears a counterbore in the inner ring but comes as close as possible to the surface 194 and to the annular shoulder 196. Thus lubricant under pressure can escape from the ball bearings which have the clearance groove 194 arranged outermost, but only a limited amount of lubricant can escape.

The contra angle head, in which these bearings are used to support the bur tube, may be placed under pressure of air and lubricant in the form of a mist so that the bearings are constantly lubricated, but the lubricant is of a non-toxic character and is carried by the water into the mouth of the patient, water being employed for cooling the bur driven by the contra angle.

The lubrication for this contra angle may be connected at the point 108, in the elbow 31, which may be provided with automatic and continuous lubrication by air pressure and lubricant as described in my application, Serial No. 620,434, filed November 5, 1956, on Dental Handpieces.

The operation of the burlatch is as follows:

When it is desired to secure a bur shank in the bur tube 52, the shank is inserted while the sleeve 94, with its prong 93 is rotated to such position that the prong rotates out of the slot 96.

The flat on the upper end of the tool shank 80 permits the head 92 to pass the prong at this time and the tool shank 80 is inserted to the point shown in Fig. 2, with the flats on the shank 80, and the inside of the bur tube 52 engaging each other.

Cap 98 is then pressed downward until teeth 104 and teeth 95 engage each other, and the rotating sleeve 94 is then rotated with the prong 93. The prong rotates into the inclined slot 96 and lifts the sleeve 94 by virtue of the slope of the slot 96, the prong engaging below the head 92 on the bur shank 80 and locking the bur shank in the bur tube 52.

The shoulder at the end of the flat surfaces 90 on the shank and inside of bur tube limits the rotation of the tube 94 when the tool shank 80 is tightly secured in the bur tube.

Tool shank 80, sleeve 94, and bur tube 52 all rotate together so that there is no wear on the heel end of the tool shank.

The bur shank may be released by pressing on the cap 98 and rotating it in the opposite direction, during which the teeth 104 engage teeth 95 and rotate sleeve 94, until prong 93 moves outward in slot 96 until head 92 can pass prong 93.

It will thus be observed that I have invented an improved burlatch for contra angles in which the bur shank and its locking member rotate with the bur tube so that there is no wear on the heel end of the bur shank. All play is taken up and vibration is minimized. There is less wear on the inside of the bur tube and the nylon seal ring excludes all grit, grindings and foreign material from the inside of the bur tube.

While I have illustrated and described a preferred embodiment of my invention, many modifications may be made without departing from the spirit of the invention, and I do not wish to be limited to the precise details of construction set forth, but desire to avail my self of all changes within the scope of the appended claims.

Having thus described my invention, what I claim as new and desire to secure by Letters Patent of the United States is:

1. In a tool and driving head assembly for dental handpieces, the combination of a body provided with bearings and having a bur tube rotatably mounted in said bearings, said bur tube being provided at its inner end with an inwardly projecting flattened portion having a transversely extending flat surface in a cylindrical bore; a tool shank having a cylindrical body and a flattened end portion with a surface complementary to the flat surface inside the tube, and means carried by the bur tube and rotating with the bur tube for securing the bur shank in the bur tube, said bur shank having an annular groove at its end, forming an annular head flattened at one side for securement of the bur shank in the tube, the said bur tube having a peripherally inclined slot in its side wall adjacent said annular groove for passing said securing means through the slot into said annular groove, the said securing means comprising an inwardly projecting prong engaging beneath the head of said bur shank, and the said prong being carried by a rotating and sliding sleeve, a cap rotatably mounted on said head, and said cap having teeth for engaging teeth on said sleeve to rotate the sleeve and move the prong into or out of the slot.

2. In a tool and driving head assembly for dental handpieces, the combination of a body provided with bearings and having a bur tube rotatably mounted in said bearings, said bur tube being provided at its inner end with an inwardly projecting flattened portion having a transversely extending flat surface in a cylindrical bore; a tool shank having a cylindrical body and a flattened end portion with a surface complementary to the flat surface inside the tube, and means carried by the bur tube and rotating with the bur tube for securing the bur shank in the bur tube, said bur shank having an annular groove at its end, forming an annular head flattened at one side for securement of the bur shank in the tube, the said bur tube having a peripherally inclined slot in its side wall adjacent said annular groove for passing said securing means through the slot into said annular groove, the said securing means comprising an inwardly projecting prong engaging beneath the head of said bur shank, and the said prong being carried by a rotating and sliding sleeve, a cap rotatably mounted on said head, and said cap having teeth for engaging teeth on said sleeve to rotate the sleeve and move the prong into or out of the slot, the said teeth on the end of the sleeve and the inside of the cap being of V-shape adapted to cam the cap outward to a free position when the bur tube is rotating.

3. In a tool and driving head assembly for dental handpieces, the combination of a body provided with bearings and having a bur tube rotatably mounted in said bearings, said bur tube being provided at its inner end with an inwardly projecting flattened portion having a transversely extending flat surface in a cylindrical bore; a tool shank having a cylindrical body and a flattened end portion with a surface complementary to the flat surface inside the tube, and means carried by the bur tube and rotating with the bur tube for securing the bur shank in the bur tube, said bur shank having an annular groove at its end, forming an annular head flattened at one side for securement of the bur shank in the tube, the said bur tube having a peripherally inclined slot in its side wall adjacent said annular groove for passing said securing means through the slot into said annular groove, the said securing means comprising an inwardly projecting prong engaging beneath the head of said bur shank, and the said prong being carried by a rotating and sliding sleeve, a cap rotatably mounted on said head, said cap having teeth for engaging teeth on said sleeve to rotate the sleeve and move the prong into or out of the slot, the said teeth on the end of the sleeve and the inside of the cap being of V-shape adapted to cam the cop outward to a free position when the bur tube is rotating, and a compression spring inside said head and urging said cap outward so that the cap must be pushed inward to engage the teeth.

4. A dental handpiece assembly comprising, a tool head having a bore provided with a bur tube rotatably mounted in bearings in said bore, said head having an annular shoulder at its upper end, and having a cylindrical surface, a burlatch actuating cap rotatably mounted on said cylindrical surface, said cap having an inwardly extending portion engaging said annular shoulder to retain the cap on the head, a compression spring urging said cap outwardly and means carried inside said cap for engaging and actuating a burlatch by pressing the cap inward and rotating the cap.

5. A dental handpiece assembly comprising, a tool head having a bore provided with a bur tube rotatably mounted in bearings in said bore, said head having an annular shoulder at its upper end, and having a cylindrical surface, a burlatch actuating cap rotatably mounted on said cylindrical surface, said cap having an inwardly extending portion engaging said annular shoulder to retain the cap on the head, a compression spring urging said cap outwardly and means carried inside said cap for engaging and actuating a burlatch by pressing the cap inward and rotating the cap, the said means comprising a multiplicity of inwardly projecting teeth and said burlatch comprising a sleeve having complementary teeth.

6. A dental handpiece assembly comprising, a tool head having a bore provided with a bur tube rotatably mounted in bearings in said bore, said head having an annular shoulder at its upper end, and having a cylindrical surface, a burlatch actuating cap rotatably mounted on said cylindrical surface, said cap having an inwardly extending portion engaging said annular shoulder to retain the cap on the head, a compression spring urging said cap outwardly and means carried inside said cap for engaging and actuating a burlatch by pressing the cap inward and rotating the cap, the said means comprising a multiplicity of inwardly projecting teeth and said burlatch comprising a sleeve having complementary teeth, the said teeth being of substantially shallow V-shape so that the teeth are adapted to be cammed apart when the cap is pushed inward while the burlatch sleeve is rotating.

7. A dental handpiece assembly comprising, a tool head having a bore provided with a bur tube rotatably mounted in bearings in said bore, said head having an annular shoulder at its upper end, and having a cylindrical surface, a burlatch actuating cap rotatably mounted on said cylindrical surface, said cap having an inwardly extending portion engaging said annular shoulder to retain the cap on the head, a compression spring urging said cap outwardly and means carried inside said cap for engaging and actuating a burlatch by pressing the cap inward and rotating the cap, the said means comprising a multiplicity of inwardly projecting teeth and said burlatch comprising a sleeve having complementary teeth, the said teeth being of substantially shallow V-shape so that the teeth are adapted to be cammed apart when the cap is pushed inward while the burlatch sleeve is rotating, said burlatch sleeve having an inwardly projecting prong for engaging a shoulder on a bur shank, said bur shank having a flattened portion providing a clearance for said prong when the prong is in position to pass said flattened portion.

8. A dental handpiece assembly comprising, a tool head having a bore provided with a bur tube rotatably mounted in bearings in said bore, said head having an annular shoulder at its upper end, and having a cylindrical surface, a burlatch actuating cap rotatably mounted on said cylindrical surface, said cap having an inwardly extending portion engaging said annular shoulder to retain the cap on the head, a compression spring urging said cap outwardly and means carried inside said cap for engaging and actuating a burlatch by pressing the cap inward and rotating the cap, the said means comprising a multiplicity of inwardly projecting teeth and said burlatch comprising a sleeve having complementary teeth, the said teeth being of substantially shallow V-shape so that the teeth are adapted to be cammed apart when the cap is pushed inward while the burlatch sleeve is rotating, said burlatch sleeve having an inwardly projecting prong for engaging a shoulder on a bur shank, said bur shank having a flattened portion providing a clearance for said prong when the prong is in position to pass said flattened portion, said bur tube having an inclined slot passing said prong and acting to cam the prong upward to engage a shoulder on the bur shank to secure a shank in the bur tube.

9. A tool and bur tube assembly for dental handpiece burs and the like comprising, a tool supporting member having a cylindrical shank, the said shank being provided at its upper end with an annular groove of substantially rectangular cross section, forming an annular head at the end of the shank, said annular head being flattened at one side for engagement with a complementary driving surface, and a bur tube for receiving said shank, said bur tube having an annular bore and said bore being provided with an inwardly projecting complementary flattened portion for passing and engaging the flattened portion on said head, the said bur tube having a peripherally inclined slot adjacent said annular groove in the shank, and a prong carried by the bur tube and projecting through said slot into said annular groove to engage below said head to secure the shank in the tube, the said prong being carried by a rotating and sliding sleeve mounted on the outside of said bur tube to actuate the prong to locking or unlocking position by rotation, said sleeve having actuating shoulders on its end, and a cap rotatably mounted and having complementary shoulders for engaging selectively and rotating said sleeve.

10. A driving head for dental handpieces comprising, a longitudinally extending portion provided with a drive shaft and a bevel gear, said head having a transversely extending portion provided with a bur supporting tube rotatably mounted therein and having a bevel gear, said bevel gear having a tubular extension outside said bur tube and a cylindrical annular sleeve of resilient plastic located in said extension of said bevel gear for engaging a tool shank and excluding foreign matter.

11. A driving head for dental handpieces comprising, a longitudinally extending portion provided with a drive shaft and a bevel gear, said head having a transversely extending portion provided with a bur supporting tube rotatably mounted therein and having a bevel gear, said bevel gear having a tubular extension outside said bur tube and a cylindrical annular sleeve of resilient plastic located in said extension of said bevel gear for engaging a tool shank and excluding foreign matter, said bur tube being provided with ball bearings at its ends and mounted in said transverse portion of said head, the said ball bearings comprising a pair of races and one race carrying a nylon sealing ring having a clearance with the other race to exclude foreign material from the ball bearings.

12. A contra angle assembly, comprising a housing provided with an obtuse angle said housing being threaded internally at its ends, a tubular extension threaded externally at its ends and having an annular shoulder adjacent each of said latter threads, said extension containing a pair of ball bearings mounted in counterbores, and a shaft rotatably mounted in said ball bearings, and having a driven gear at one end and a bevel gear at the other end, a transverse head provided with a radial, tubular, internally threaded member at one side thereof on said extension, said head having ball bearings secured at its ends, and a bur supporting tube rotatably mounted in said ball bearings, a bevel gear on the lower end of said bur supporting tube, and having a tubular extension, said housing having an opening for receiving lubricant in the form of air and lubricating mist under pressure, each of said ball bearings having inner and outer races and balls, and one of said races including a nylon sealing ring carried in a recess in one race, and having a close clearance with the other race to permit air containing lubricant mist to pass, lubricating the bearings, but holding back the air and lubricant mist under pressure to exclude foreign matter from entry into the ball bearings.

13. A contra angle according to claim 12, in which the bur holding tube stops short of the end of the tubular extension of the bevel gear which supports the bur holding tube and is provided with a resilient nylon sleeve in the tubular extension of the bevel gear adapted to grip with a tight frictional fit on a tool shank to reduce leakage of air and lubricating mist and prevent entry of grit or grindings along the tool shank.

References Cited in the file of this patent

UNITED STATES PATENTS

| | | |
|---|---|---|
| 2,194,187 | Skinner | Mar. 19, 1940 |
| 2,701,914 | Dietrich | Feb. 15, 1955 |